United States Patent [19]
Wood et al.

[11] Patent Number: 6,020,009
[45] Date of Patent: Feb. 1, 2000

[54] PRODUCTION OF AN AROMATIZING AGENT

[75] Inventors: Robert Dustan Wood, Buchillon; Hugh Hose, Treycovagnes; Beat Denis Zurbriggen, Buelach, all of Switzerland

[73] Assignee: Nestec S.A., Vevey, Switzerland

[21] Appl. No.: 08/882,536

[22] Filed: Jun. 25, 1997

[30] Foreign Application Priority Data

Jul. 9, 1996 [EP] European Pat. Off. .............. 96201923

[51] Int. Cl.⁷ ..................................................... A23B 7/10
[52] U.S. Cl. ............................ 426/52; 426/49; 426/533; 426/534; 426/650
[58] Field of Search ................................ 426/534, 49, 52, 426/533, 650

[56] References Cited

U.S. PATENT DOCUMENTS

| | | | |
|---|---|---|---|
| 4,064,279 | 12/1977 | Withycombe et al. | 426/535 |
| 4,156,029 | 5/1979 | Withycombe et al. | 426/535 |
| 4,308,284 | 12/1981 | Noda et al. | 426/7 |
| 4,913,923 | 4/1990 | Van Den Ouweland | 426/533 |
| 5,141,756 | 8/1992 | Bajracharya et al. | 426/46 |

FOREIGN PATENT DOCUMENTS 0 582 050 A1  2/1994  European Pat. Off. .
0 640 2941 A1  3/1995  European Pat. Off. .

OTHER PUBLICATIONS

Database WPI Week 8842, Derwent Publications Ltd., London, GB; AN 88–296331 XP002020659 & JP–A–63 216 450 (Kikkoman Corp.), Sep. 8, 1988.

Database WPI Week 9503, Derwent Publications Ltd., London, GB; AN 95–018243 XP002020659 & JP–A–06 303 940 (Kikuchi S. et al.), Nov. 1, 1994.

*Primary Examiner*—Leslie Wong
*Attorney, Agent, or Firm*—Pennie & Edmonds LLP

[57] ABSTRACT

Process for the production of a meat flavor, in which a mixture of a plant source of proteins and of a plant source of carbohydrates is prepared having at least initially 45% by weight of dry matter, the mixture is inoculated with one or more microbial species traditionally used in the preparation of fermented cooked meat products, and is then incubated for a time period and at a temperature sufficient to produce a meat flavor. The meat flavor may be extracted with oil, a gas, or a fluorocarbon-based solvent. The mixture may be a koji. Flavor compositions are thus produced. In particular, a salami flavor is obtained by incubation with a mixture of *Pediococcus pentosaceus* and *Staphylococcus xylosus* or *Staphylococcus carnosus*.

10 Claims, No Drawings

PRODUCTION OF AN AROMATIZING AGENT

TECHNICAL FIELD

The subject of the invention is a new process for the production of a meat flavor, as well as any food compositions containing such a flavor.

BACKGROUND ART

It is well known that a meat-like taste can be produced by the reaction, in the presence of heat, between the free amino groups of amino acids and/or of peptides, and the carbonyl groups of reducing sugars.

FR 1,584,629 (Kyowa Hakko Kogyo) thus describes a method for the preparation of a seasoning having a taste similar to that of a meat extract, in which a protein is enzymatically hydrolyzed, sugars are added, the water content and the pH are adjusted, and the mixture is heated. For the same purpose, WO 94/25580 (Novo Nordisk) suggests hydrolyzed a protein source with a proteolytic preparation derived from *Aspergillus oryzae*. Likewise, EP 582050 (Société des Produits Nestlé) describes a process in which a protein source consisting of a mixture of lovage and onion is prepared, sugar is added, hydrolysis is performed by means of a lactic acid fermentation, and then the hydrolyzed mixture is heat treated.

A meat flavor can also be developed solely by a fermentation process, without having to use a heat treatment. EP 106236 (Société des Produits Nestlé) describes, in this regard, a process in which, in a liquid medium, a vegetable is fermented by halophilic lactic acid bacteria, in the presence of a powdered hydrolyzed protein source and 1% to 4.5% by weight of salts based on the weight of the vegetable.

Moreover, it is known that other fermentation processes which produce flavor factors used for various seasonings are known. For example, the method for the preparation of a traditional soya sauce has two fermentation steps involving a koji culture and a halophilic microorganism, respectively. EP 417481 (Société des Produits Nestlé) thus describes a process for the preparation of a fermented soya sauce, in which a koji is prepared by fermentation, in the solid state, with a koji culture, of a mixture of cooked soya and roasted wheat, the koji is hydrolyzed in an aqueous suspension for 3–8 h at 45–60° C. with the enzymes produced during the fermentation with the koji culture, a moromi is prepared by adding sodium chloride to the hydrolyzed koji suspension, the moromi is fermented by a halophilic microorganism, it is pressed, a liquid is recovered from the pressed moromi, this liquid is pasteurized and clarified in order to remove the sediments.

U.S. Pat. No. 4,308,284 (Kikkoman Shoyu) also describes a rapid process for the preparation of a fermented soya sauce, in which the conventional steps for the preparation of a koji and then of a moromi are reduced to a single step. For that, a koji is directly fermented, in the liquid state, in the presence of salts of a carboxylic acid with 4 carbon atoms and certain lactic acid bacteria and/or yeasts, and then a liquid is recovered from the pressed koji.

The soya sauces thus produced do not, however, have a meat flavor.

The subject of the present invention is a new method for the production of a meat flavor, from plants, which is relatively simple to carry out, and which does not require using sophisticated reagents.

SUMMARY OF THE INVENTION

To this end, in the process for the production of a meat flavor according to the present invention, a mixture of a plant source of proteins and of a plant source of carbohydrates is prepared, the mixture having at least initially 45% by weight of dry matter. This mixture is inoculated with one or more microbial species traditionally used in the preparation of fermented cooked meat products, and is then incubated for a period and at a temperature sufficient to produce a meat flavor.

To carry out the present process, it is possible to use at least one microorganism chosen from the species *Staphylococcus xylosus, Staphylococcus carnosus, Micrococcus varians, Lactobacillus sake, Lactobacillus curvatus, Lactobacillus plantarum, Lactobacillus pentosus, Pediococcus acidilactici, Pediococcus pentosaceus, Carnobacterium piscicola, Carnobacterium divergens, Streptomyces griseus, Debaromyces hansenii, Penicilium nalgiovensis* and *Penicillium candidum*, for example.

The invention also relates to any food compositions having a meat, in particular salami, flavor obtained according to the present process, as well as any use of these compositions to flavour food products.

Unexpectedly, the mere fermentation, in the solid state, of plants by microorganisms in cooked meat products makes it possible to obtain a characteristic meat flavor. The best flavors are obtained when a fermentation of plants, in the solid state, by a koji culture and by microorganisms in cooked meat products are combined.

Furthermore, the present process differs clearly from the traditional techniques for the preparation of a meat flavor, in which the protein source is hydrolyzed beforehand in order to release meat flavor precursors, the reaction medium is liquid, and/or the mixture is heat treated in order to cause the free amino groups to react with the reducing saccharides.

DETAILED DESCRIPTION OF THE PREFERRED EMBODIMENTS

In the present text, the expression "meat flavor" in fact covers the meat odor sensed by the nose, and the meat taste felt in the mouth.

To carry out the present process, a mixture of a plant source of proteins and of a plant source of carbohydrates, which may come from leguminous plants, oleaginous plants and/or cereals, cooked or roasted, for example soya, bean, wheat gluten and/or rice, is therefore prepared. Obviously, the invention does not cover the use of materials of animal origin to obtain a meat flavor.

Preferably, the plant materials are finely ground, and water is added to a desired moisture content, it being indeed necessary for the dry matter content of the mixture to be greater than or equal to 45%.

The plant mixture is inoculated with a culture of microorganisms found in cooked meat products, that is to say microorganisms which are traditionally used for the fermentation of cooked meat products, such as sausages or salamis, for example. These microorganisms are well known to persons skilled in the art, and may be chosen among the species *Staphylococcus xylosus, Staphylococcus carnosus* (DSM 4952 by way of example), *Micrococcus varians, Lactobacillus sake, Lactobacillus curvatus* (DSM 8768 by way of example), *Lactobacillus plantarum, Pediococcus pentosaceus* (DSM 7002 by way of example), *Lactobacillus pentosus* (DSM 1966 by way of example), *Pediococcus acidilactici, Carnobacterium piscicola* (also commonly called *Lactobacillus carnis*: DSM 20722), *Carnobacterium divergens* (also commonly called *Lactobacillus divergens*: DSM 20723), *Streptomyces griseus* (DSM 1054 by way of example), *Debaromyces hansenii* (DSM 1956 by way of example), *Penicilium nalgiovensis*, and *Penicillium candidum*, for example (DSM means "Deutsche Sammlung von Mikroorganismen und Zellkulturen" [German Collection of Microorganisms and Cell Cultures], Mascheroder Weg 1b, 38124 Braunschweig, Germany).

This culture of microorganisms found in cooked meat products may be a culture, in an appropriate medium, comprising $10^6$ to $10^9$ CFU of microorganisms per gram (Colony Forming Unit), which may be used for the inoculation in an amount of 1–10% by weight. Preferably, this culture of microorganisms found in cooked meat products is concentrated, or it is freeze-dried or spray-dried, so as to obtain a composition comprising $10^9$ to $10^{11}$ CFU of microorganisms per gram, which can then be used for the inoculation in an amount of 0.01–1% by weight. The methods of concentration, freeze-drying and spray-drying, as well as the appropriate media for culturing microorganisms found in cooked meat products are well known to persons skilled in the art.

Preferably, the plant mixture is inoculated with at least 2 different species of microorganisms found in cooked meat products, so as to promote the production of numerous meat flavor precursors.

If a sausage or ham flavor is desired, it is preferable to choose, among the microorganisms added to the plant mixture, at least one species chosen among the species *Lactobacillus sake* or *Lactobacillus curvatus*.

On the other hand, if it is desired to obtain a typical salami flavor, it is also preferable to add to the plant mixture at least one species of microorganism chosen from the species *Micrococcus varians, Staphylococcus xylosus* or *Staphylococcus carnosus*. A typical "Rapelli" salami flavor may thus be obtained when at least one *Pediococcus pentosaceus* is combined with one *Staphylococcus xylosus* or one *Staphylococcus carnosus* ("Rapelli": Schweizer Lebensmittelindustrie 9/10, 12–14, 1994; Rapelli Mario SA, 6855 Stabio, Switzerland). By way of example, intense salami flavors may thus be obtained according to the present process with a mixture comprising at least one *Pediococcus pentosaceus*, one *Staphylococcus xylosus* and one *Lactobacillus carnis*. Such a mixture is commercially available under the name "LMP No. 7525" ferment from Scheid-Rusal (6038 Gisikon, Switzerland).

Other ferments suited to the fermentation of meat are also commercially available. By way of example, there may be mentioned the ferments "LMH No. 7526" from Scheid-Rusal (49% *Lactobacillus carnis*, 49% *Staphylococcus xylosus*, 2% *Debaromyces hansenii*), "Baktoferment 61" from Rudolf Müller & Co. (Giessener Strasse 94, 35415 Polhlheim, Germany; 100% *S. carnosus*), "Duploferment 66" from Rudolf Müller & Co. (50% *S. carnosus* and 50% *L. plantarum*), "Duploferment 78P" from Rudolf Müller & Co. (50% *S. carnosus* and 50% *P. pentosaceus*).

It should be noted that the plant mixture is not immersed in an aqueous medium, but that it is simply moistened to the point where water cannot even drip from the plant materials. Indeed, the fermentation of this mixture is carried out in the solid state, which means that the mixture initially comprises at least 45% by weight of dry matter. In particular, it has been noted that the higher the initial proportion of dry matter, the better the meat flavors develop, it being possible for the said proportion to be 50–65% by weight of dry matter, especially 55–60%, for example. It may also be noted that the proportion of dry matter in the mixture varies during the fermentation, it being thus capable of increasing further from 1 to 15% depending on the fermentation time and the initial quantity of dry matter.

The plant mixture may be incubated in the presence of microorganisms found in cooked meat products at 15–60° C., especially 15–45° C., for 1 to 10 days.

The plant mixture may be a traditional koji, that is to say a mixture of a source of proteins, a source of carbohydrates and a koji culture, it being possible for the mixture to be already fermented or otherwise by the koji culture.

The koji culture may be obtained from a koji spore culture as may be commercially obtained, especially in Japan or in China, which comprises, in particular, Aspergillus, Rhizopus and/or Mucor spores, and especially microorganisms belonging to the species *Aspergillus soyae, Aspergillus oryzae* (ATCC 20386 by way of example), *Aspergillus phoenicis* (ATCC 14332 by way of example), *Aspergillus niger* (ATCC 1004 by way of example), *Aspergillus awamori* (ATCC 14331 by way of example), *Rhizopus oryzae* (ATCC 4858 by way of example), *Rhizopus oligosporus* (ATCC 22959 by way of example), *Rhizopus japonicus* (ATCC 8466 by way of example), *Rhizopus formosaensis, Mucor circinelloides* (ATCC 15242 by way of example), *Mucor japanicus, Penicillium glaucum* and *Penicillium fascum* (ATCC 10447 by way of example).

The koji culture may be a biologically active part of a koji previously produced and fermented for 3 to 10 days at 15–45° C. Generally, the plant mixture is inoculated in an amount of 1 to 10% by weight of such a koji. If the koji previously produced has been concentrated and reduced to a powder in a conventional manner, the plant mixture may be inoculated in an amount of at least 0.01% koji powder. For more details, the contents of U.S. Pat. No. 3,711,303 is hereby incorporated by reference into the description of the present invention.

In a first specific embodiment of the present invention, a mixture of a plant source of proteins and of a plant source of carbohydrates is prepared, it is inoculated with a koji culture and one or more species of microorganisms found in cooked meat products, it is fermented for 1–10 days at 15–45° C., and the meat flavor is extracted from the fermented koji.

In a second specific embodiment of the present invention, a mixture of a source of proteins and of a source of carbohydrates is prepared, it is inoculated with a koji culture, it is fermented for 1–10 days at 15–45° C., it is inoculated with one or more species of microorganisms found in cooked meat products, it is fermented for 1–10 days at 15–45° C., and the meat flavor is extracted from the fermented koji.

It is important to note that an aromatic juice may be prepared from the koji fermented by microorganisms found in cooked meat products. For that, salts, water and at least one halophilic microorganism are added to the koji, it is incubated for a period and at a temperature sufficient to produce a moromi, and then an aromatic juice is separated from the moromi.

It is also possible to prepare a moromi from a koji which has been fermented according to the invention and which has been subjected to one or more extractions of meat flavor. However, it is preferable to carry out relatively gentle extractions so as to preserve in the koji a proteolytic activity of the order of 500–3000 proteolytic units per g of mixture (standard units).

To extract the meat flavor from the fermented mixture according to the invention, extraction techniques using oil, gases in the supercritical or liquid state, or fluorocarbons may be used.

To extract the flavor using oil, the koji fermented by the microorganisms found in cooked meat products may be mixed with oil, especially an animal oil or a vegetable oil including sunflower, palm, olive or groundnut oil, in an amount of 1 part by weight of koji to 0.1 to 10 parts by weight of oil. The mixture may be incubated at 15–65° C. for 10 min at 48 h, preferably at 40–60° C. for 2–24 h, and then the fatty fraction is separated from the solid fraction, for example by pressing and centrifugation. The oil may also be enriched with meat flavor, by extracting fresh koji (nonextracted) several times with the same oil, for example. It is also possible to extract the fermented koji with oil in a conventional counter-current extraction system.

It is also possible to extract the meat flavor using gas in the supercritical or liquid state, especially chosen from $CO_2$, propane, butane and nitrous oxide. The techniques for extraction with a gas in the supercritical and/or liquid state are well known to persons skilled in the art. The technical content of WO 91/14373, EP 454097, and of Pellerin et al. (International Association for the Promotion of Supercritical Fluids, 3rd Conference on Supercritical Fluids—Applications to Natural Products, Jan. 29–30, 1996, Grasse, France) is thus expressly incorporated by reference into the teaching according to the present invention. To summarize this technique, in at least one extraction stage, the koji is brought into contact with a gas in the liquid state and/or in the supercritical state according to the pressure and the temperature. The gas containing the meat flavor is transferred from the extraction stage to at least one separation stage, the gas is separated from the aromatic compounds by modifying the pressure and/or the temperature, the aromatic compounds are recovered and the gas is recycled to the extraction stage.

Preferably, a fermented koji according to the invention is first extracted with oil, then in a second step, the oil is continuously extracted with a gas in the supercritical and/or liquid state, the extraction temperature being preferably greater than the melting point of the oil. It is desirable that the temperature does not exceed 60° C. so as not to damage the aromatic compounds of the meat. A temperature gradient of the order of 1 to 15° C. may be applied to the extraction stage. The oil already extracted may be continuously recirculated in the extraction stage so as to increase the final extraction yield. Finally, 1 part of oil may be extracted with 1–100 parts of fluid in the supercritical state, at 120–160 bar, and then the meat flavor extracted may be separated by gas expansion at a pressure of the order of 50–100 bar.

It is also possible to extract the meat flavor from the fermented koji or from an extract already enriched with flavor, for example an oil extract, using fluorocarbons according to the technique described in EP 616821, whose content is expressly incorporated by reference into the teaching of the present invention. This technique is particularly advantageous because it makes it possible to obtain, at a reduced cost, a sufficient concentration of meat flavor.

The meat flavor extracts according to the present invention may be perfectly preserved for 1– 12 months at a temperature of –10° C. to 30° C. However, it is preferable to add to the aromatic extract at least one antioxidant in order to enhance the stability of the flavors. Among the antioxidants, there may be used tocopherols, ascorbic acid or one of its salts, citric acid or one of its salts, butylated hydroxyanisole (BHA), rosmarinic acid or butylated hydroxytoluene (BHT).

It is also possible to choose to encapsulate the meat flavors according to the invention in a mixture of maltodextrin and/or cyclodextrin, it being possible for the mixture to then be freeze-dried or spray-dried. Persons skilled in the art have numerous methods of encapsulation at their disposal. As a guide, the methods of encapsulation described in U.S. Pat. No. 5,206,025, U.S. Pat. No. 5,087,461 and U.S. Pat. No. 512,290 are expressly incorporated by reference into the description of the present invention.

The aromatic extracts according to the invention may be used to flavor products based on meat, crisps, spices, pasta, sauces or broths, in an amount of 0.01 to 8% by weight.

It is also possible to envisage combining a food product directly with part of the fermented plant mixture according to the present invention. For this purpose, it is preferable to inactivate the enzymatic and bacterial/fungal activities by treating the mixture at a very high pressure combined with moderate heat. Indeed, temperatures greater than 60° C. are capable of denaturing the aromatic compounds involved in the meat taste. As a guide, the process for inactivating enzymes and bacteria by high pressure, described in EP 686352, is expressly incorporated by reference into the description of the present invention.

The present invention also relates to an aromatic composition comprising at least, as aromatic molecule, 2-acetyl-1-pyrroline, 1-octen-3-ol, the ethyl ester of isobutanoic acid, 2,4-decadienyl, nonanal, phenylacetaldehyde, 2-pentylfuran and/or 2-heptenal.

EXAMPLES

The invention is described in greater detail below with the aid of the additional description which follows, which refers to examples of preparation of koji fermented by microorganisms in cooked meat products. These examples are preceded by the description of an analytical method. The percentages are given by weight unless otherwise stated. It goes without saying, however, that these examples are given by way of illustration of the subject of the invention and do not in any manner constitute a limitation thereto.

Sensory Analysis

A panel of 10 people compares, under a blind design, the meat odor and taste exhibited by fermented koji extracts obtained in the examples described below, relative to the Swiss "Rapelli" salami flavor (Schweizer Lebensmittelindustrie 9/10, 12–14, 1994; Rapelli Mario SA, 6855 Stabio, Switzerland). The scores (+), (++) and (+++) indicate, respectively, that the product has, compared with the control, a salami flavour which is not very intense, which is satisfactory, and which is intense. The absence of salami flavor is most often characterized by a fungus odor characteristic of koji.

Example 1

Several tests are carried out in which there are mixed in an incubator 7 kg of cooked wheat gluten, 3 kg of roasted wheat flour, water, 0.015% by weight of the powdered *Aspergillus oryzae* culture Super Ichumarisake® (BIOC, Japan) and various proportions of the Scheid-Rusal AG No. 7528 commercial ferment (6038 Gisikon, Switzerland) recommended for the fermentation of salami and which comprises 33% *Pediococcus pentosaceus,* 66% *Staphylococcus xylosus* and 1% *Lactobacillus carnis*. The mixture is incubated for 42 h at 30° C., then the proportion of final dry matter is determined and the meat flavor produced is characterized by means of the sensory analysis described above.

For comparison, several other tests are carried out in parallel in which the same wheat mixtures are incubated in the presence of only 0.015% of powdered *Aspergillus oryzae* culture.

The results, presented in Table 1 below, show that a characteristic salami flavor is produced when the commercial salami ferment is used. It can also be noted that the higher the initial proportion of dry matter, the more intense the salami flavor.

TABLE 1

| Test | Dry matter % initial - % final | % salami ferment (SF); % A. ozyzae (AO) | flavor (score) |
|---|---|---|---|
| 1 | 51%–64% | 0.015 AO | fungus |
| 2 | 51%–64% | 0.015 AO; 0.2 SF | salami ++ |
| 3 | 51%–64% | 0.015 AO; 0.02 SF | salami ++ |
| 4 | 54%–67% | 0.015 AO | fungus |
| 5 | 54%–67% | 0.01S AO; 0.2 SF | salami + |
| 6 | 54%–67% | 0.015 AO; 0.02 SF | salami + |
| 7 | 55%–70% | 0.015 AO | fungus |
| 8 | 55%–70% | 0.015 AO; 0.2 SF | salami +++ |
| 9 | 55%–70% | 0.015 AO; 0.02 SF | salami ++ |

Example 2

Several tests are carried out in which there are mixed in an incubator 7 kg of cooked soya, 3 kg of roasted wheat flour, water, 0.015% by weight of the powdered *Aspergillus oryzae* culture Super Ichumarisake® and various proportions of the Scheid-Rusal AG No. 7528 commercial ferment. The mixture is incubated for 42 h at 30° C., then the proportion of dry matter is determined and the meat flavor produced is characterized by means of the sensory analysis described above.

For comparison, several other tests are carried out in parallel in which the same soya mixtures are incubated in the presence of only 0.015% of powdered *Aspergillus oryzae* culture.

The results, presented in Table 2 below, show that a characteristic salami flavor is produced when the commercial salami ferment is used. It can also be noted that the higher the initial proportion of dry matter, the more intense the salami flavor.

TABLE 2

| Test | Dry matter % initial - % final | % salami ferment (SF); % A. ozyzae (AO) | flavor (score) |
|---|---|---|---|
| 1 | 53%–68% | 0.015 AO | fungus |
| 2 | 53%–69% | 0.015 AO; 0.2 SF | salami + |
| 3 | 51%–66% | 0.015 AO | fungus |
| 4 | 51%–67% | 0.015 AO; 0.2 SF | salami ++ |
| 5 | 51%–67% | 0.015 AO; 0.02 SF | salami ++ |
| 6 | 59%–71% | 0.015 AO | fungus |
| 7 | 59%–71% | 0.015 AO; 0.2 SF | salami +++ |

Example 3

There are mixed in an incubator (Fujiwara Koji Machine, JP) 400 kg of a mixture comprising 7 parts of cooked soya, 3 parts of roasted wheat flour, water to a dry matter content of 58%, 0.015% by weight of the powdered *Aspergillus oryzae* culture Super Ichumarisake®, and 0.2% of the Scheid-Rusal No. 7528 commercial ferment. The mixture is incubated at 30° C. for 42 h, and then the final proportion of dry matter is determined and the meat flavor produced is characterized by means of the sensory analysis described above.

The results show that the final dry matter content is 72% and that the fermented koji releases an intense salami flavor (score +++).

Example 4

Several tests are carried out in which 2 kg of the fermented koji obtained in Example 3 are mixed with 2 kg of sunflower oil, the incubation is carried out at different times and at different temperatures, and finally the mixtures are pressed in order to recover the fatty liquid part. The incubation conditions are given in Table 3 below.

Part of the oil obtained from the mixture incubated for 24 h at 50° C. is enriched with salami flavor (see Table 3 below: "2× enrichment"). For that, 1 kg of the fermented koji obtained in Example 3 is mixed with 1 kg of oil obtained from the mixture incubated for 24 h at 50° C., this new mixture is incubated for 24 h at 50° C., and finally it is pressed in order to recover the fatty liquid part.

Part of the oil thus enriched is also centrifuged.

The extracts are finally subjected to the sensory analysis described above, with the difference that a score of 1 to 9 is given to the flavor of the extracts, the score of "1" indicating that a meat flavor different from that of the reference salami is obtained, and the score of "9" indicating that a salami flavor is obtained which is much more intense that than of the reference salami. An order of preference is also given to the various extracts, the attribute 1 indicating the best preference, and the attribute 7 indicating the worst preference.

The results presented in Table 3 below show that it is preferable to incubate the koji fermented in oil at high temperatures (50° C.) and for less than 24 h. Furthermore, the enrichment with flavor is clearly perceptible by the tasters.

TABLE 3

| Test No.: Conditions | Remarks on the salami flavor | Score | Ranking |
|---|---|---|---|
| 1: Incubation 24 h, 4° C. | Weak salami flavor bread taste | 3.7 | 7 |
| 2: Incubation 24 h, 35° C. | Strong fatty flavor similar to the reference | 6 | 4 |
| 3: Incubation 1 h, 50° C. | Weak salami flavor, no aftertaste | 4.7 | 6 |
| 4: Incubation 2 h, 50° C. | Strong flavor, grilled note, which is very pleasant, similar to the reference | 6.3 | 5 |
| 5: Incubation 4 h, 50° C. | Flavor stronger than the reference, typical of a salami flavor, which is very aromatic | 6.7 | 2 |
| 6: Incubation 24 h, 50° C. | Flavor stronger than the reference, grilled note, which is moderately aromatic | 6 | 6 |
| 7: Incubations 24 h, 50° C. Enrichment 2x No centrifugation | Strong flavor, slightly acid, very similar to the flavor of a Rapelli salami | 6.7 | 1 |
| 8: Incubations 24 h, 50° C. Enrichment 2x Centrifugation | Strong fatty flavor similar to the reference flavor | 6.7 | 3 |

Example 5

The stability of the salami flavor of the extract obtained in test 8 of Example 4 is analysed as a function of temperature, time, and the presence or otherwise of 0.1% antioxidant Herbor 025 (Fis, USA). The results show that the salami flavor is perfectly preserved at 4° C. for 3 months in the absence or in the presence of antioxidant. On the other hand, the extracts preserved for 2 or 3 months at 20° C. in the absence of antioxidant lose about half of their flavor intensity, whereas those preserved for 2–3 months at 20° C.

in the presence of antioxidant do not lose any flavor. At temperatures greater than 25° C., in the absence of antioxidant, the extracts completely lose their flavor after 2 months, whereas the extracts comprising an antioxidant lose less than 10 to 30% of their flavor after 3 months of preservation.

Example 6

The fermented koji obtained in Example 3 is extracted with a carbon dioxide fluid in the supercritical state. For that, one part of koji is brought into contact with 20 parts of carbon dioxide at 40° C., at a pressure of 150 bar, for 50 min. The meat flavor is separated by passing carbon dioxide through 3 successive separators having a pressure of 90, 60 and 50 bar respectively. The carbon dioxide is recycled in the extractor. Finally, a fatty phase having a strong salami flavor is recovered at each outlet of the separators. It is estimated that the salami flavor can be concentrated by a factor of at least 100.

Example 7

The enriched oil obtained in test 8 of Example 4 is extracted by means of a carbon dioxide fluid in the supercritical or liquid state according to the temperature. For that, 0.9 to 1.56 kg/h of oil and 26.8 to 39 kg/h of carbon dioxide are continuously circulated in a column comprising 4 extraction stages having a temperature of 30, 40, 40 and 45° C. respectively, the pressure being adjusted to 130 or 150 bar according to the test considered. The oil is continuously recycled into the extraction column. The aromatic fraction is separated by passing the fluid through 2 successive separators having a pressure of 90 and 55 bar respectively. The carbon dioxide is recycled into the extractor. Finally, a fatty phase having a strong salami flavor is recovered at each outlet of the separators. The yield represents the percentage of material extracted in the two separators compared with the initial quantity of oil. The results are presented in Table 4 below.

TABLE 4

| Test | Oil (kg/h) | $CO_2$ (kg/h) | Extraction pressure (bar) | Intensity of the flavor in the 90 bar separator | Intensity of the flavor in the 55 bar separator | Yield (%) |
|---|---|---|---|---|---|---|
| 1 | 1.56 | 39 | 150 | ++ | +++ | 6.5 |
| 2 | 1.44 | 37.4 | 130 | ++ | +++ | 6.3 |
| 3 | 0.9 | 26.8 | 130 | ++ | +++ | 8.7 |

Example 8

The enriched oil obtained in test 8 of Example 4 is extracted by means of a fluorocarbon solvent, according to the procedure described in EP 616821. For that, 1 part of solvent is brought into contact with 1 part of enriched oil, at a pressure of 6 bar, at room temperature and for 2 h. The solvent is recovered and then an aromatic fatty fraction is separated, leaving the solvent to evaporate at ambient pressure.

According to the tests, the extraction of the oil with one or more solvents may be repeated several times. To this end, 3 different solvents may be used which comprise, respectively, 100% 1,1,1,2-tetrafluoroethane (solvent A), 90% 1,1,1,2-tetrafluoroethane and 10% butane (solvent B), and 90% 1,1,1,2-tetrafluoroethane and 10% dimethyl ether (solvent C). The results are presented in Table 5 below. The yield represents the percentage of material extracted compared with the initial quantity of oil. Although the yields may appear to be lower than those obtained for the extracts described in Example 7, this extraction technique is nevertheless promising from the point of view of its cost (about 10 times less expensive than an extraction with a supercritical fluid), and the high concentration of salami flavor (intensity greater than that obtained in the extracts of Examples 6 and 7).

TABLE 5

| Test | Extraction conditions | Yield (%) |
|---|---|---|
| 1 | Extraction 3 times with solvent A | 0.88 |
| 2 | Oil of test 1 again extracted 3 times with solvent C | 0.90 |
| 3 | Oil of test 2 again extracted 3 times with solvent B | 1.56 |
| 4 | Extraction once with solvent A | 0.41 |
| 5 | Extraction once with solvent B | 0.36 |
| 6 | Extraction once with solvent C | 0.28 |

Example 9

A moromi is prepared from the extracted koji obtained in test 8 of Example 4. For that, 40% fermented koji is added to an aqueous solution comprising 18% sodium chloride, it is inoculated with a *Saccharomyces cerevisiae* culture comprising more than $10^8$ CFU/ml, it is incubated at 30° C. for 2 days, it is pressed and an aromatic juice is separated.

What is claimed is:

1. Process for the production of a meat flavor, which comprises preparing a mixture of a plant source of proteins and of a plant source of carbohydrates, the mixture having at least initially 45% by weight of dry matter, inoculating the mixture with one or more microbial species traditionally used in the preparation of fermented cooked meat products, and incubating the inoculated mixture for a time period and at a temperature sufficient to ferment the mixture and produce a meat flavor, wherein the microbial species is selected from the group consisting of *Staphylococcus xylosus, Staphylococcus carnosus, Micrococcus varians, Lactobacillus sake, Lactobacillus curvatus, Lactobacillus plantarum, Lactobacillus pentosus, Pediococcus acidilactici, Pediococcus pentosaceus, Carnobacterium piscicola, Carnobacterium divergens, Streptomyces griseus, Debaromyces hansenii, Penicilium nalgiovensis* and *Penicillium candidum*.

2. Process according to claim 1, wherein the mixture is a koji.

3. Process according to claim 1, in which the mixture is inoculated with a koji culture and one or more species of microorganisms found in cooked meat products, the inoculated mixture is incubated for 1–10 days at 15–45° C. to allow the mixture to ferment, and which further comprises extracting the meat flavor from the fermented koji.

4. Process according to claim 1, in which the mixture is inoculated with a koji culture, it is incubated for 1–10 days at 15–45° C., and which further comprises inoculating the incubated mixture again with one or more species of microorganisms found in cooked meat products, further incubating the mixture for 1–10 days at 15–45° C. to allow the mixture to ferment, and extracting the meat flavor from the fermented koji.

5. Process according to claim 2, which further comprises preparing a moromi from the fermented koji.

6. Process according to claim 1, which further comprises selecting the microorganism to be a mixture of *Pediococcus*

*pentosaceus* and *Staphylococcus xylosus* or *Staphylococcus carnosus* so that a salami flavor is produced.

7. A method for flavoring of a food product which comprises producing a meat flavor according to the process of claim 1 and adding a flavor effective amount of the flavor to a food product to impart a meat flavor thereto.

8. A method for flavoring of a food product which comprises producing a meat flavor according to the process of claim 4 and adding a flavor effective amount of the flavor to a food product to impart a meat flavor thereto.

9. A method for flavoring of a food product which comprises adding a flavor effective amount of the salami flavor composition of claim 1 to a food product to impart a salami flavor thereto.

10. A process according to claim 1, wherein the meat flavor is a salami, ham, or sausage flavor.

* * * * *